C. M. PETERSEN.
VEHICLE WHEEL.
APPLICATION FILED JULY 6, 1914.

1,140,766.

Patented May 25, 1915.

WITNESSES:
F. C. Matheny
O. Johnson

INVENTOR
Christian M. Petersen
BY
C. D. Haskins
ATTORNEY

UNITED STATES PATENT OFFICE.

CHRISTIAN M. PETERSEN, OF SEATTLE, WASHINGTON, ASSIGNOR, BY DIRECT AND MESNE ASSIGNMENTS, TO THEODORE E. OSTLUND, OF SEATTLE, WASHINGTON.

VEHICLE-WHEEL.

1,140,766.

Specification of Letters Patent. Patented May 25, 1915.

Application filed July 6, 1914. Serial No. 849,047.

*To all whom it may concern:*

Be it known that I, CHRISTIAN M. PETERSEN, a citizen of the United States, residing at Seattle, in the county of King and State of Washington, have invented a certain new and useful Improvement in Vehicle-Wheels, of which the following is a specification.

My invention relates to improvements in resilient wheels that are particularly adapted for automobiles, auto-trucks and the like, and the object of my improvement is to provide wheels of this class which shall be simple to make, reliable, and durable under all conditions of use and which shall be resilient to such degree as will permit the use of solid cushion tires or iron tires thus to obviate the greater cost and the annoyance of frequent puncture of pneumatic tires. I accomplish this object by devices illustrated in the accompanying drawings wherein—

Figure 1:
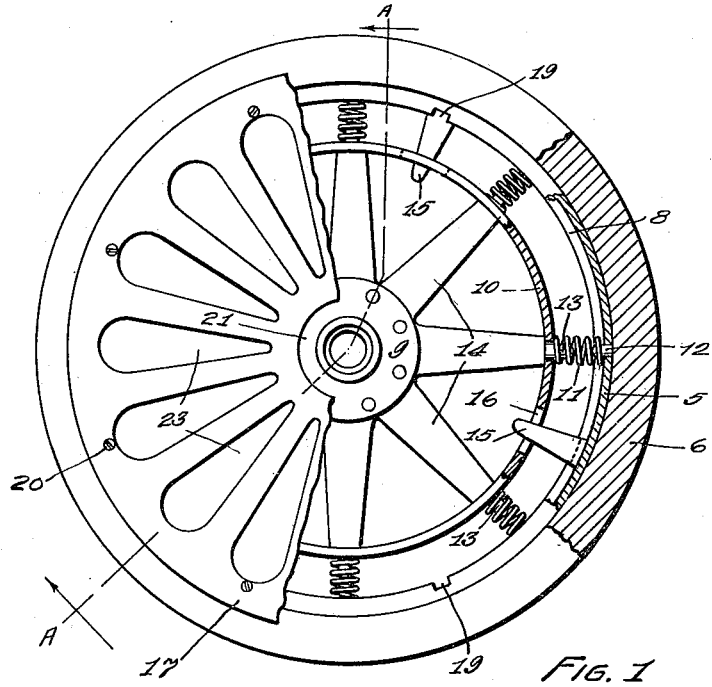
Figure 2:
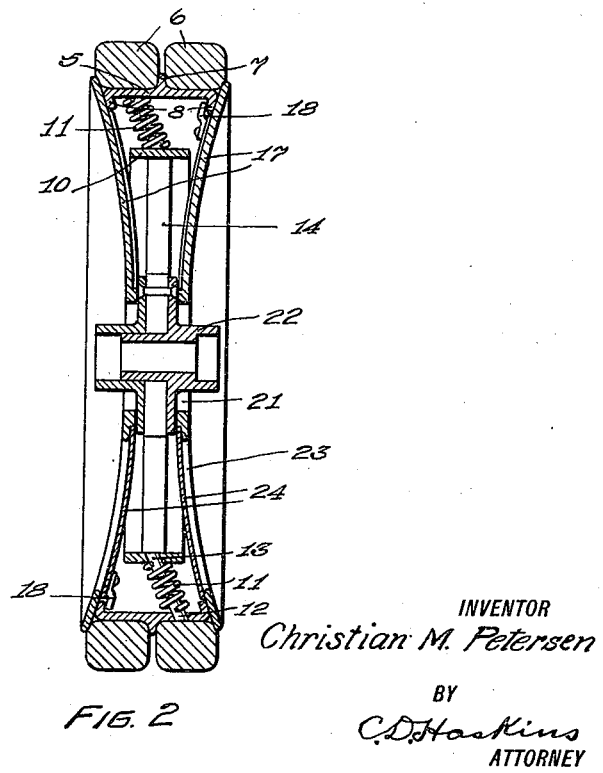

Figure 1 illustrates a wheel embodying one form of my invention by a view in side elevation, a portion only of one part being shown, more clearly to disclose other parts, while a portion of each of three other parts are shown in vertical section, and Fig. 2 is a view of the same in cross-section on broken line A, A of Fig. 1.

Referring to the drawings, throughout which like reference numerals indicate like parts, 5 is the rim of a wheel and 6 is a two part solid tire, preferably of the rubber cushion type, that is mounted on the rim 5, which rim 5 is preferably formed with a centrally disposed annular ridge 7 that projects outwardly therefrom between the two sections of said tire to prevent such sections from moving sidewise on said rim 5.

The outer side edges 8 of the rim 5 are curved downwardly, as more clearly shown in Fig. 2, and a wheel 9 of any ordinary form of construction is disposed concentrically within the rim 5, the rim 10 of the wheel 9 being spaced from the rim 5 and interposed between such tire 10 and the rim 5 are a plurality of compression springs 11 which springs are preferably set in alternate angular positions, every alternate one of such springs 11 being inclined outwardly in one direction to bear against the rim near one edge thereof and the remaining springs 11 being inclined outwardly in the opposite direction to bear against the rim 5 near its opposite edge to secure the wheel 9 against sidewise displacement with respect to the rim 5, and further to serve as a cushion between the rim 10 of the wheel 9 and the greater rim 5, there being provided in said rim 5 inwardly projecting studs 12 that serve as guides to secure the outer ends of the springs 11 in their proper positions, the inner ends of such springs 11 being secured in a fixed position on the tire 10 by studs 13 provided on the ends of the spokes 14 of the wheel 9.

To insure that the wheel 9 may not be moved sidewise within the rim 5 against the pressure of the inclined springs 11 I have provided a plurality of guide studs 15 that may be formed integral with the rim 5 or rigidly secured thereto to project inwardly therefrom through slots or holes 16 that are provided in the tire 10 of the wheel 9, as more clearly shown in Fig. 1.

To prevent the collection of dirt within the wheel 9 and the rim 5 I have provided concavo-convex shaped side plates 17 for each side of such wheel, such plates 17 being provided near their peripheries with engaging hooks or lugs 18, more clearly shown in Fig. 2, that engage with the inturned edge portions 8 of the rim 5 to hold the side plates 17 in position, the hooks 18 being inserted through notches 19 in such inturned edges 8 and the plate 17 then being turned through a part of a revolution to cause such hooks 18 to engage securely with the inturned edge portions 8 of the rim 5, there being provided screws 20 that are screwed through the plates 17 to project through the notches 19 to prevent the plates from turning after they have been secured in place.

The plates 17 are each provided with a large opening 21 that is concentric with the hub 22 of the wheel 9 within which said hub 22 may be free to move when the plates 17 are in place, and such plates are preferably constructed of light thin metal, as of sheet aluminum, and are formed with radial openings 23 that are covered by light thin sheet material 24, as of sheet metal or canvas.

The peripheral edges of the plates 17 are disposed to project outwardly past the outer surface of the rim 5 to engage with the sides of the tires 6 to hold such tires 6 in place when said side plates 17 are secured in their normal positions on the wheel.

The operation of my spring wheel may be described as follows: When the wheel is assembled, as shown in Fig. 2, and placed on a motor vehicle, as on an automobile, the springs 11 on the lower side of such wheel will be brought under compression and then that part of the weight of the vehicle that is carried by the wheel 9 will be borne by such springs 11 in such lower side and if the vehicle is moved over an uneven surface of a rough roadbed the springs 11, between the rim 5 and the tire 10 of the wheel 9, together with the solid tire 6, will be compressed and serve to absorb the shock occasioned by the passage of such wheel over such rough surface.

Obviously, numerous changes in the form of the various details embodied in my spring wheel may be resorted to without departing from the spirit of my invention or sacrificing any of its advantages.

What I claim is:

The combination with a vehicle wheel, of an outer rim, of larger diameter than the wheel-rim of said wheel, disposed to surround said wheel and spaced therefrom, said outer rim being provided with inturned notched edges, springs interposed between said rim and the tire of said wheel, tires provided on said outer rim, and side plates provided with catch hooks that are adapted to engage with the inner faces of the inturned edges of said outer rim to secure said side plates to said wheel.

In witness whereof, I hereunto subscribe my name this 20th day of June, A. D. 1914.

CHRISTIAN M. PETERSEN.

Witnesses:
F. C. MATHENY,
O. JOHNSON.

Copies of this patent may be obtained for five cents each, by addressing the "Commissioner of Patents, Washington, D. C."